United States Patent Office 3,114,614
Patented Dec. 17, 1963

3,114,614
LIQUID HIGH ENERGY FUELS
Joseph J. Forrester, 3rd, Niagara Falls, N.Y., assignor, by mesne assignments, to Olin Mathieson Chemical Corporation, a corporation of Virginia
No Drawing. Filed July 1, 1955, Ser. No. 519,610
3 Claims. (Cl. 44—76)

My invention relates to a new liquid composition of matter which is useful as a high energy fuel.

Prior to my present invention it was known to prepare liquid reaction products of diborane and acetylene. David M. Ritter application Serial No. 401,410, filed December 30, 1953, now abandoned, describes the preparation of a product of that type. Stange, Weilmuenster and Zaslowsky application Serial No. 411,336, filed February 19, 1954, now abandoned, is directed to a particularly advantageous method which can be used in the preparation of the liquid addition product of diborane and acetylene by reacting the diborane and acetylene in the vapor phase at a temperature of 100° C. to 250° C., preferably 110° C. to 140° C., while the reactants are diluted with an inert gas, such as hydrogen or nitrogen. Preferably, the molecular ratio of diborane to acetylene is maintained between 1 to 1 and 3.5 to 1 and the amount of diluent entering with the reactants is within the range of 75 to 85 percent of the total volume of the incoming gases, although other relative proportions of diborane, acetylene and diluent gas can be employed. The liquid addition product of diborane and acetylene in itself, is a useful high energy fuel.

It is also known in the art to prepare decaborane, a solid material which is stable at room temperatures and which is at least one of the most stable of the boron hydrides. Decarborane is a chemical compound characterized by a very high heat of combustion, approximately 28,000 B.t.u. per pound.

In accordance with my present invention, I have discovered that the liquid reaction product of acetylene and diborane is a particularly valuable solvent for decaborane, in view of the relatively large amount of decaborane which can be dissolved in the acetylene-diborane product to provide a stable solution, particularly from the standpoint of absence of crystal formation upon cooling. My invention therefore provides a means whereby it is possible to prepare liquid high energy fuels which are advantageously stable to cooling and which at the same time possess a higher energy content than does the pure liquid addition product of diborane and acetylene.

The following examples illustrate in detail the preparation of compositions falling within the scope of my invention and are to be considered not limitative.

*Example I*

A liquid 1:1 diborane-acetylene reaction product was prepared in the manner described in Example I of the aforementioned Stange application Serial No. 411,336 employing an oil temperature of 141–147° C., an observed reaction temperature of 130–135° C., a gaseous diborane flow rate of 740 ml. per minute, a gaseous acetylene flow rate of 295 ml. per minute, and a gaseous hydrogen flow rate of 4120 ml. per minute (flow rate ratio of hydrogen:diborane:acetylene of 14:2.5:1). In the particular experiment in which the diborane-acetylene addition product was prepared the reaction was carried out for a period of 325 minutes.

In a 250 ml. one-necked flask, 20.6 grams of decaborane was slurried with 52.8 grams of the liquid 1:1 acetylene-diborane reaction product prepared as just described. The flask was then attached to a water-cooled condenser with a T-tube inserted at the top. One arm of the T-tube was attached to a source of dry nitrogen; and the other was attached, in series, to traps cooled with Dry Ice and liquid nitrogen. A magnetic stirrer was used for agitation.

Following this, the flask was heated by immersion in an oil bath. All of the decaborane was dissolved with some gas evolution at 61° C. After allowing the flask to cool to 57° C. an amount of white solid precipitated. The solution was thereafter heated to 100° C. and allowed to cool. Considerable foaming was observed during this second heating. Upon cooling, a white solid precipitated at 49° C. The mixture again was heated to 100° C. and held at 100° C. for 20 minutes. More foaming was noted. The solution was cooled to room temperature without recrystallization of any solids. Such liquid contained 52 percent by weight of boron, corresponding to a 28 percent by weight solution of decaborane, based upon the weight of the decaborane and acetylene-diborane reaction product, and had a heat of combustion of approximately 24,500 B.t.u. per pound.

*Example II*

In an inert atmosphere, decaborane is added in small increments to 6.8 grams of a liquid 1:1 addition product of diborane and acetylene prepared in the manner described in Example I of the aforementioned Stange et al. application Serial No. 411,336. The acetylene-diborane reaction product is maintained at 28° C. in a 500 ml. 3-necked flask, the two side necks of which are fitted with a thermometer and a flask for the addition of the decaborane. The center neck is fitted with a water-cooled condenser with a T-tube inserted at the top. One arm of the T-tube is attached to the source of dry nitrogen; the other is attached, in series, to traps cooled with Dry Ice and liquid oxygen. A magnetic stirrer is used for agitation.

After 1.3 grams of decaborane is added the solution becomes saturated. The solution contains 16 grams of decaborane per 100 grams of solution and has a net heat of combustion of approximately 24,000 B.t.u. per pound.

Various modifications can be made in the procedures of the specific examples to provide other embodiments which fall within the scope of my invention. Thus, the relative amounts of decaborane and liquid acetylene-diborane reaction product present in my composition can be varied, depending upon the energy content desired in the product. In general, the composition will contain at least about 5 percent by weight of decaborane, in order that it will have an energy content appreciably higher than that of the acetylene-diborane reaction product alone, and, being a solution, will not contain decaborane in amount exceeding its solubility. I prefer that my composition contain from about 10 to about 30 percent by weight of decaborane, based upon the total weight of the composition.

The compositions of my invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of my invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of my invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the composition produced in accordance with Example I and containing 28 percent by weight of decaborane, for example, this local fuel to air ratio by weight is approximately 0.075. For the higher energy fuels of the present invention, because of their higher heating values in comparison with the simple hydrocarbons, the overall fuel-air ratio by weight across the combustor will be approximately 0.005 to 0.016 if the resultant gas temperature is to remain within the presently established tolerable temperature limits. Thus, when used as the fuel supplied to the combustor of an aircraft gas turbine engine, the products of the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The products of my invention can also be employed as aircraft gas turbine fuels in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the products of my invention can be employed as fuels in ramjet enginess and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The burning characteristics of the products of my invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products of my invention eliminates the need of flameholding devices within the combustion zone of the afterburner. When employed in an afterburner, the fuels of my invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products of my invention will improve the combustion process of the ramjet in much the same manner as that described for the afterburner because of their improved chemical reactivity over that of simple hydrocarbon fuels. When employed in a ramjet the fuels of my invention will be simply substituted for hydrocarbon fuels and used in the established manner.

I claim:

1. A liquid composition of matter which consists essentially of a solution of decaborane in a liquid addition product of acetylene and diborane said liquid addition product being obtained by reacting diborane and acetylene in a molecular ratio maintained between 1 to 1 and 3.5 to 1 in the vapor phase at a temperature of 100° C. to 250° C. diluted with sufficient inert gas such that the amount of diluent entering with the reactants is within the range of 75 to 85 percent of the total volume of the incoming gases, the amount of decaborane being at least about 5 percent by weight, based on the total weight of the composition.

2. A composition according to claim 1 containing decaborane within the range from about 10 to about 30 percent by weight, based upon the total weight of the composition.

3. A composition according to claim 1 in which the liquid addition product of acetylene and diborane is an addition product of one mole of acetylene and one mole of diborane.

References Cited in the file of this patent

Stock et al.: Ber. 56 (1923), page 808.